United States Patent [19]
Procter

[11] 4,259,361
[45] Mar. 31, 1981

[54] PROCESS FOR PREPARING A DEHYDRATED PROTEIN PRODUCT FROM ANIMAL MATTER

[76] Inventor: Donald Procter, 44 Merton St., Upper Hutt, New Zealand

[21] Appl. No.: 970,964

[22] Filed: Dec. 19, 1978

[30] Foreign Application Priority Data

Nov. 24, 1978 [NZ] New Zealand ........... 186057/187600

[51] Int. Cl.³ .................. A23J 1/10; A23K 1/00; A23K 1/10
[52] U.S. Cl. ........................... 426/285; 71/15; 71/19; 71/64 D; 426/453; 426/473; 426/518; 426/519; 426/641; 426/651; 426/805; 426/807
[58] Field of Search ............ 426/285, 641, 643, 644, 426/646, 657, 453, 471, 473, 518, 519, 520, 805, 807; 71/15, 16, 19, 20, 22, 64 D, 64 DC

[56] References Cited

U.S. PATENT DOCUMENTS

| | | | |
|---|---|---|---|
| 527,810 | 10/1894 | Records | 71/15 |
| 1,536,308 | 5/1925 | Remus | 426/473 |
| 2,158,354 | 5/1939 | Cowgill | 426/465 |
| 2,359,199 | 9/1944 | Burnett | 34/214 |
| 2,439,180 | 4/1948 | McKee et al. | 426/473 |
| 2,452,983 | 11/1948 | Birdseye | 426/464 |
| 3,050,383 | 8/1962 | Wilson | 71/64 D X |
| 3,110,574 | 11/1963 | Kodras | 426/468 X |
| 3,254,421 | 6/1966 | Kielsmeier et al. | 34/12 |
| 3,468,675 | 9/1969 | Potzl | 426/518 X |
| 3,759,723 | 9/1973 | Gunson et al. | 426/646 X |
| 3,882,257 | 5/1975 | Cagle | 426/646 X |
| 3,969,539 | 7/1976 | Sumner et al. | 426/641 |
| 4,020,187 | 4/1977 | McCulloch et al. | 426/657 X |
| 4,045,590 | 8/1977 | Weigle | 426/657 X |

*Primary Examiner*—Arthur L. Corbin
*Attorney, Agent, or Firm*—Richards, Harris & Medlock

[57] ABSTRACT

A process for the production of dehydrated foodstuffs, feedstuffs or plant fertilizers includes the following steps: (a) preparing protein-containing animal matter to a particulate size acceptable to homogenizing equipment; (b) subjecting the comminuted matter to ultra homogenization; (c) heating the resultant homogenate to a temperature of between about 50° C. and 85° C. to agglomerate the protein; (d) granulating the agglomerate; (e) drying the granules at a temperature not greater than 95° C. until their moisture content is within the range of about 20% to about 50% by weight; (f) passing the partially dried granules through a mincer to form kibbles; (g) drying the kibbled material to achieve a moisture content not more than 8% by weight.

8 Claims, 2 Drawing Figures

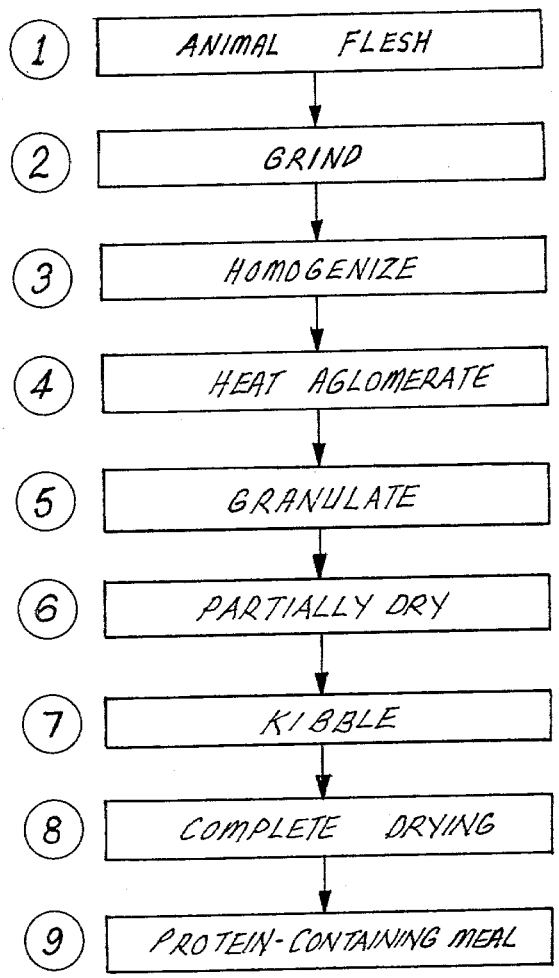
Figure I

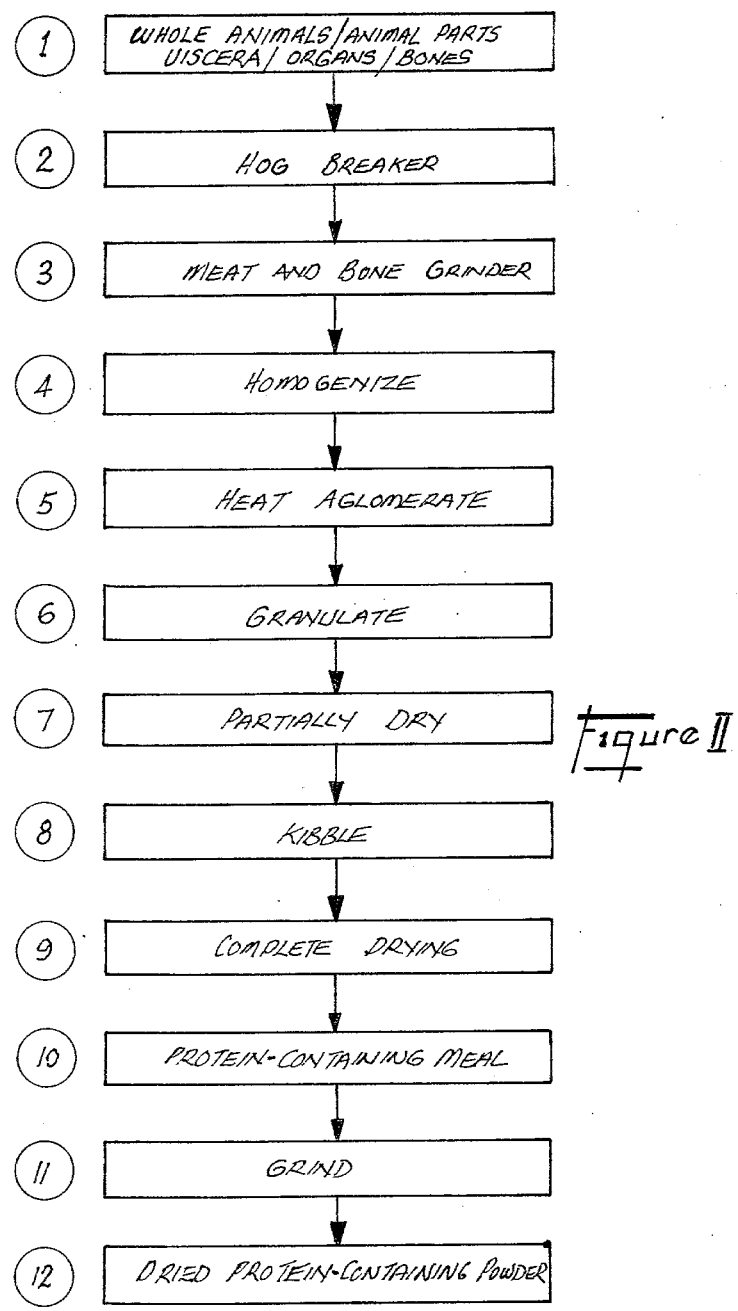
Figure II

PROCESS FOR PREPARING A DEHYDRATED PROTEIN PRODUCT FROM ANIMAL MATTER

This invention relates to a process for manufacturing dehydrated foodstuffs, feedstuffs or plant fertilizers. In one aspect of this invention it relates to the use of the process to prepare protein-containing foodstuffs for human food applications and can be used either in a dehydrated or rehydrated form. Another aspect relates to the use of the process to prepare protein-containing meals for use in pet foods in either a dehydrated or rehydrated form. A further aspect of the invention relates to the use of the invention in preparing animal feedstuffs. In still another aspect of the invention it relates to a method for treating meat packing plant wastes as an alternative to conventional rendering. This last application includes the preparation of plant fertilizers from, for example, the bones of slaughtered animals.

In a present day world which is continually burdened by excalating costs there is a need to develop processes and systems that lower the costs of preserving, storing and transporting food, in particular, proteins. This need is further felt in a world where food surpluses can exist in one area while in another area there are food shortages. The costs of preserving, storing and transporting of food contribute materially to the selling price of foodstuffs and can put the price beyond the means of people in under developed countries with a low standard of living where food shortages exist. Still further any reduction in the volume and/or weight of foodstuffs, feedstuffs or fertilizers will materially reduce the storage freight and handling charges incurred in the storage and transportation of these materials.

There is also a need to preserve such materials by a means which does not require refrigeration which makes possible their use in under developed areas of the world where such modern day facilities do not exist. Further, there is a need to reduce the energy requirements of processing, storing and transporting foodstuffs in a world which is running out of fossil fuels.

In a world in which people are concerned about preserving the environment and in providing pure, uncontaminated and unadulterated food, there is a need for food preserving and preparing processes that do not require the or at the very least minimise the need for addition of chemical additives. Generally the process of this invention does not require chemical additives such as emulsifiers, to achieve a satisfactory performance of this invention. The addition of antioxidants, as commonly used in the preparation of dehydrated proteins is however contemplated.

Accordingly it is an object of this invention to alleviate at least some of the problems enumerated. It has been proposed to precook meat and other protein-containing material, mince grind or otherwise particulate the meat or other material and then dry the cooked particulate material.

These processes result in final products whose characteristics such as taste and texture are unacceptably removed from those of the meat from which the final product was derived.

Further, prior proposals teach unacceptably high temperatures which cause early agglomerations of the protein and the separation of fat and natural juices from the meat. The fat so separated is either lost or must be recovered and re-incorporated into proteinaceous matter at a later stage.

The present invention however does not suffer from these disadvantages as the animal protein-containing material is ultra homogenized before any application of heat. The proteins are thus not agglomerated prior to any mincing or homogenizing of the material. Further, the present invention specifies the need for ultra homogenization (as herein defined) while prior proposals teach only a very much larger particle size.

According to the present invention therefore, there is provided a process for the manufacture of dehydrated foodstuffs, feedstuffs or plant fertilizers including the steps of:

(a) subjecting raw or uncooked, or substantially raw or uncooked, protein-containing animal matter to ultra homogenization;

(b) heating the resulting homogenate to form an agglomerate;

(c) drying the agglomerate to form particulate foodstuffs, feedstuffs or fertilizers.

Further according to this invention there is provided a process for the production of dehydrated foodstuffs, feedstuffs or plant fertilizers including the following steps;

(a) preparing protein-containing animal matter to a particulate size acceptable to the homogenizing equipment;

(b) subjecting the comminuted matter to ultra homogenization;

(c) heating the resultant homogenate to a temperature of between about 50° C. and 85° C. to agglomerate the protein in the homogenate;

(d) granulating the agglomerate;

(e) drying the granules at a temperature not greater than 95° C. until their moisture content is within the range of about 20% to about 50% by weight;

(f) passing the partially dried granules through a mincer to form kibbles;

(g) drying the kibbled material to achieve a moisture content not more than 8% by weight.

Preferably the temperature of the particles is kept below 60° C. for the purposes of attaining optimum rehydration properties.

While major uses of the present invention include the preparation of foodstuffs for humans and feedstuffs for animals the process of this invention may also be used to prepare animal derived plant fertilizers. To this end bones and/or other substantially proteinaceous material derived from animals may be treated as described to form a particulate material which when spread onto the ground or incorporated thereinto will readily take up moisture and rehydrate and then decompose to provide plant nutrients.

In this specification reference is made to the processing of proteinaceous animal matter. By "procteinaceous animal matter" it is meant any material, including flesh, organs, viscera, skin or bones, or any combination thereof. Reference to animals includes reference to mollusk, shell fish, crustacea, fish, plancton, emphibia, reptiles, mannals and insects. The aforementioned list of animals is not considered to be complete but only representative of animals whose matter may be processed by this invention. The kibbles produced by step (f) above typically (although not exclusively) are of a size not greater than about ⅛ inch (average of measurements in the three dimensions) and are rough in form and texture to thereby have a large surface area to facilitate the drying step (g). The kibbles, when dried, can be powdered by grinding to produce a powdered product which may be more acceptable in soups or for incorporating into other processed foods or feedstuffs or fertilizers.

The word kibbled is defined in the Oxford English Dictionary as "To bruise or grind coarsely".

This definition largely explains the physical action necessary to produce the desired kibbled form of the end product. The action of kibbling as taught by the described process of this specification is necessary to break open the case hardened film of protein which occurs in the early stages of drying on the gelled particles. This assists the drying of the particles in the second stage of drying and the development of a cellular structure within the particles. This cellular structure is necessary to achieve good rehydration properties of the dried kibbles. Kibbling also effects an irregular shaped particle which is desirable in achieving a "chunky" appearance to the rehydrated meat particle.

In the drying of the material, for example at steps (e) and (g) above, it should be born in mind that the temperature of the material being dried will be measurably lower than that of the drying medium. This is so because the evaporation of the moisture in the material will cause a heat loss to the material not fully compensated for by the acquisition of heat from the drying medium.

While this invention teaches that effective storage of dehydrated protein-containing material can be achieved in certain instances with a moisture content as high as 8% by weight, it has been found that to ensure effective preservation against degredation during long term storage at ambient temperatures, a moisture content of 5% by weight or less seems desirable.

By the term ultra-homogenization it is meant that the homogenization procedures of the process of this invention are exceptional when compared with commercial meat emulsions or homogenates as used in processed meat products such as sausages, luncheon meats and the like products.

The procedure of preparing the homogenate as described within the specification is exceptional, in that the meat tissues are more finely homogenized than commercial meat emulsions.

In establishing the extent to which the described process more finely homogenizes than standard commercial meat emulsions, an electron micrographic study was conducted on a beef homogenate prepared as described and compared with samples taken from commercially produced emulsified meat products. The result showed that the beef homogenate prepared by the method described herein, had a particle size ranging from 0.4 to 3.0 microns, whereas the commercial meat emulsion ranged from 3.7 to 18 microns.

Now whereas the generally accepted practice in making meat emulsions is to retard frictional heating, which occurs during emulsification by adding an amount of ice or cold water to the meat, in the process of this invention this heat build up is desirable and should be achieved as rapidly as possible to retard biodegration. In practice, using a Fryma colloid mill, 3 passes of the meat through the mill are required to attain the degree of homogenization required. The temperature of the meat emulsion existing the colloid mill on the final pass typically ranges from about 55° C. to 65° C. and relates to the temperature of the meat at the start. Meat in a frozen, chilled or fresh state has been used successfully in the process.

A further advantage of the process is that lower grades of meat such as neck trimmings and the like can be used. The procedure of ultra homogenization reduces all tendons, skin and connective tissues to a minute particle size and these are blended with the muscle tissues. Upon heat agglomeration and drying of the processed meat these tissues are indistinguishable from the muscle tissues. This has the value of improving the digestibility of the meat and improving the economics by upgrading lower value meat trimmings.

Because of the fine homogenization the product of the process should be of value for dietetic use where easy digestion of the meat is desirable.

The dehydrated meat protein-containing products produced by this process are characterised by their ability to be stored without refrigeration and to rehydrate for use in processed meat products, convenience foods and the like. The invention also provides a process for dealing with meat works waste to prepare meat meals as an alternative to conventional rendering and can also have application with poultry and fish waste.

One form of the invention will now be described although it must be appreciated that such description is by way of example only and that the values and ranges may be varied and that variations may be made in the process without departing from the spirit and scope of this invention as may be ascertained from this specification.

The raw (or substantially raw) deboned animal flesh is cut up and ground through a meat mincing machine to a size which is suitable for acceptance by the homogenizing equipment. A standard commercial meat mincing machine is suitable for this purpose. The size of the ground meat particle is dependent upon the size of the homogenizing equipment; large scale machines can accept larger meat particles. The animal flesh is then subjected to ultra homogenization which breaks down the fibrous tissue and emulsifies the associated fats. The resulting homogenate occurs as a smooth, creamy, liquid to semi-solid substance. For small scale production a commercial Waring Blender has been used. This machine, a model 91-265, is capable of generating impeller speeds of up to 20,000 revolutions per minute. On a larger scale commercial meat emulsifying machines with fine settings can achieve the degree of homogenization required. Such machines are in common use in the processed meat industry for preparing sausages, luncheon meats, bologna and the like products. The ultra homogenizated animal tissue is then subjected to heating to effect gelation of the meat proteins. The heating step can be achieved by a number of means, for example, a steam jacketed mixing pan, a steam heated extruder or a microwave oven. It is also anticipated that the frictional heat created during the homogenization step of the process could, in some circumstances, produce sufficient heat to effect gelation of the proteins. Also with some homogenizing equipment it is possible to apply steam to the body of the homogenizing chamber thereby providing a means of heating the homogenate to a temperature at which the meat proteins will agglomerate. It is desirable that during the heat agglomeration stage that the homogenate be agitated to effect uniform heating and to assist in preparing the aggregated proteins into a granular particulate form. The particulate granule size may be further adjusted to give the desired texture by passing the aggregate through a meat mincer or wet granulating machine. The size of the particle is a matter of choice and depends upon the desired particle size required at rehydration. It has been found that a particle size of about ¼" is suitable for most purposes. The gelled aggregated protein particles can then be subjected to drying. This can be effected by a variety of drying equipment such as fluid bed dryers, hot air drying ovens, microwave ovens and such like equipment. It is desirable that the product be dried to a final moisture content of less than 5% to ensure the stability of the end product on storage. The dried product can be further ground or powdered and screened to give the texture desired.

In the preparation of these protein-containing meals it is anticipated that combinations of tissues from various animal species could be used also, combinations of animal tissues with vegetable proteins and the inclusion of carbohydrates, cellulosic substances and vegetables, is further anticipated. Also the inclusion of seasonings and flavourings. A schematic layout of a typical processing system for producing the protein meals of this invention is shown in FIG. 1. of the accompanying drawings.

The product of the process of this invention gives excellent biological results. Example 12 illustrates typical bacterial count data. On storage properties shelf life tests have been carried out with accelerated test storage samples. These show that the dehydrated meats produced by this process remain in fresh condition, containing between 0 to 1.0 parts per million malonaldehyde on a 67% moisture basis which is the acceptable level for a fresh cooked meat product. Data is given in example 11 herein.

In preparing protein-containing meals from meat works wastes which contain bones, the comminution of the bone tissue is required to take place simultaneously with the ultra homogenization. This requires more processing steps; a schematic layout of the process is given in FIG. 2 of the accompanying drawings. Whole animals or animal parts or viscera or organs or bones etc., or combinations of these materials are passed through a hog breaker or prebreaker. These are heavy duty machines capable of breaking up animal bone and other tissues and are common to the rendering industry. From the hog breaker the comminuted material is then passed through a heavy duty grinding machine which is capable of handling bones, such a machine is a Weiler Grinder, a machine which is common to the meat and rendering industries. The ground waste is then subjected to ultra homogenization. Suitable equipment for this step would be the Reitz Disintegrator or a Jeffco mill which are both high speed combined grinders and emulsifiers. Following ultra homogenization the homogenate is then subjected to heating to effect agglomeration of the proteins and then to drying. This part of the process is similar to that described in the previous paragraph and detailed in FIGS. 1 and 2 of the drawings.

The temperature at which the gelation of the proteins is normally achieved is within a range of about 55° C. and 75° C. Drying temperatures should be kept low to reduce heat denaturation of the proteins but sterilisation requirements may necessitate elevating temperatures to achieve this, in particular, when dealing with animal wastes.

EXAMPLE 1

500 grams of lean beef was ground through a hand mincing machine fitted with a 3/16" cutting plate. The ground meat was then subjected to ultra homogenization in a Starmix Blender for ½ minute. At this point the meat was a smooth creamy texture. The homogenized meat was then transferred to a steam heated pan and heated with agitation until the protein-containing mixture agglomerated. Agglomeration commenced at a temperature of about 55° C. and satisfactory gel resulted when the temperature reached about 70° C. The agglomerated protein gel was then passed through a hand mincing machine fitted with ¼" cutting plate and then dried in an oven whose temperature reached between 90° C. and 93° C. The moisture content of the finished dried powder was 7.7% and the yield was 158.7 grams of dry powder or 31.74% of the starting weight of the meat.

EXAMPLE 2

50 grams of dehydrated beef meal prepared as described in Example 1 was rehydrated with 100 grams of warm water, temperature 40° C.; a time interval of 15 minutes was allowed from the time of adding the water to the dehydrated meat for rehydration to occur. Little free water was observable after this period. 150 grams of meat, consisting of approximately 50% lean meat and 50% fat was ground in a hand grinder fitted with a ¼" cutting plate. The ground meat was then blended together with the 150 grams of rehydrated meat and formed into Hamburger patties. The hamburger patties were then pan fried and resulted in firm textured hamburger having good flavour.

EXAMPLE 3

344 grams of chicken meat which included some chicken skin was ground through a hand mincing machine fitted with a ¼" cutting plate. The ground chicken was then subjected to ultra homogenization in a Starmix blender for ½ minute. The homogenate was then transferred to a stream heated pan and heated with agitation until a satisfactory agglomerate resulted. Gelation of the proteins commenced at about 55° C. and heating was continued until the temperature had reached 67° C. when a satisfactory gel had resulted. The gel was then dried in an oven at a temperature of from 90° C. to 93° C. until a satisfactory dry product resulted. The moisture content of the dry material was 6.85% and the yield was 130.14 grams or 37.74% of the starting weight of the chicken.

EXAMPLE 4

511 grams of fish (Terakihi) was cut into pieces about 1" in size and subjected to ultra homogenization in a Starmix blender. The homogenate was then transferred to a steam heated pan and heated until a satisfactory granular gel had resulted. The homogenate was stirred during the heat gelation step. The gelled granules were then dried in an oven at a temperature of 90° C. to 93° C. until a satisfactory dried product resulted, The moisture content of the dried product was 6.1% and the yield was 162 grams or 31.70% of the starting weight of the fish.

EXAMPLE 5

20 kilos of minced lean beef (90% visual lean) was passed through a Fryma colloid mill set at a fine gap for three passes. The temperature of the meat homogenate exiting the mill was 57° C. on the third pass. The homogenized meat was then heated gently in an electrically heated pan with continuous agitation until the meat proteins had agglomerated. The temperature reached 74° C. at the end of this operation. The agglomerated meat was then passed through a hand mincing machine to reduce the size of the gelled material to about ¼" to ½" pieces. This was then placed in a fluid bed dryer having an inlet air temperature of about 60° C. On adding the charge to the fluid bed dryer the outlet air temperature fell to about 28° C. The semi dry material was removed from the dryer when the air exit temperature had reached about 40° C. then passed once more through the hand mincer. The moisture content was about 45 to 50% at this point. This procedure formed the semi dry meat into a kibble about ¼" to ½" long. The kibbled meat was returned to the fluid bed dryer until the outlet temperature had reached 58° C.

On analysis the sample gave the following data:
Moisture: 4.60%
Fat: 34.44%
Protein: 58.36%

The sample rehydrated satisfactory when mixed 1 part of dried meat to 2 parts of water.

EXAMPLE 6

45.4 kilograms of lean mutton was given one pass through a Fryma perforated disc mill model ML330 fitted with an 8 m.m. perforated disc. The mutton was then given two passes through the same mill fitted with a 2 m.m. perforated plate. Antioxidants, propyl gallate and citric acid were added in solution to the meat during the first milling operation. The temperature of the homogenate was 56° C. exiting the mill on the final pass.

The homogenate was then agglomerated in a steam tube cooker which consisted of a steam jacketed tube approximately 2 meters in length and 150 m.m. in diameter and containing within the tube an auger power by an electric motor.

Exiting the steam tube cooker the agglomerated meat had a temperature about 72°/75° C.

The agglomerate was then passed through a wet granulator which was fitted with a ½" perforated screen. The material was formed into a wet granular texture about ¼" to ½" in size.

The wet granules were then fed into a Moa fluid bed dryer which had an inlet temperature of 58° C. on the inlet and 30° C. on the outlet. The granules were removed from the dryer when the moisture content was ranging from 22 to 25% and then passed through a hand grinder fitted with a ⅜" plate to form a kibble like texture. The kibbles were then returned to the Moa dryer and removed when the moisture content was below 5%.

EXAMPLE 7

39 kilograms of lean pork was processed in the manner described in Example 6.

EXAMPLE 8

50 kilos of frozen shark meat was cut into pieces about 3" to 4" in length then given one pass through the Fryma perforated disc mill, Model ML 330, fitted with an 8 m.m. perforated disc. Antioxidants, propyl gallate and citric acid were proportioned into the fish during this first pass. The homogenized fish was then given three passes through the Fryma fitted with a 2 m.m. perforated disc. Temperature of fish exiting Fryma on fourth pass was 40° C.

The fish was then agglomerated in a steam tube cooker and then transferred to a steam jacketed pan. The fish was gently heated until the moisture content was down to 56%. The wet gelled fish was then dried in a fluid bed dryer and removed when the moisture content was reduced to about 2.0%.

EXAMPLE 9

5 kilos of beef liver was given 3 passes through a Fryma colloid mill, then heat agglomerated in an electric pan. The agglomerated liver was then passed through a hand mincer fitted with a ⅜" plate to granulate the gel. The granules were then dried in a fluid bed dryer.

EXAMPLE 10

Commercial grade whole fish consisting of a mixture of red cod (physiculus bachus) and Whiptail (Macruronus nova zealandiae) and containing all bones, viscera, fins and heads were chopped into pieces and passed 3 times through a Fryma Colloid Mill. The resulting homogenate was then heated in a microwave oven until the proteins had gelled. During the heating cycle, the homogenate was removed from the microwave oven and stirred to get uniform heating.

The temperature of the homogenate reached about 65° C. during the heating cycle. The gel was then passed through a mincing machine to form the gel into a granular particulate to facilitate drying. The wet gel particulate was then placed into a fluid bed dryer having an inlet air temperature of between 65° and 70° C. and dried until the moisture content was reduced from about 80% to about 40%. The partially dried material was then removed from the fluid bed dryer and kibbled as herein described in this specification. The resulting kibbles were returned to the fluid bed dryer and drying continued until the moisture content of the kibbles was less than 5%.

The product of this example was rehydrated in the ratio of about 1 part of dried fish kibbles to 3 parts of water and fed experimentally to mink.

In a similar experiment, the rehydrated fish kibbles were fed to domestic cats. In both cases the rehydrated product was acceptable to the animals.

EXAMPLE 11

The product of example 5 was rehydrated with water in the ratio of about 1 part dried beef kibbles to 3 parts of water.

The rehydrated beef kibbles were then fed to domestic dogs and domestic cats respectively. In both cases, the rehydrated beef kibbles were readily accepted by the animals.

EXAMPLE 12

10 kilograms of beef bones from the deboning operations of a meat works were broken in a Niven Pre-Breaker which reduced the bones to particles about less than 1½" in size. The broken bones, together with the associated meat proteins, bone marrow and fat, were then passed through a Jeffco Plate Mill fitted with a ⅜" plate then for a further pass through a Jeffco fitted with an ⅛" plate.

During the passes through the Jeffco Mills, water was added to bone mixture to facilitate grinding. The moisture content of the resulting homogenate was 54.7%.

The homogenate was then heated in a steam jacketed pan until the mixture gelled. The gel was then passed through a mincing machine fitted with a ¼" plate to break up the gel into discrete particles about less than a ¼" in size. The product was then dried in a fluid bed dryer having an inlet temperature of 70° C. until the moisture content was less than 8%. The product was then allowed to cool then ground in a hammer mill to form a granular to powder particulate having the characterists of conventional meat and bone meal produced through rendering. The product of this example was applied to a garden plot as a fertilizer and soil conditioner.

T.B.A. ANALYSIS ON MEAT

I. METHOD

Method as set out in the schedule to this specification (Tarladgis et al, modified by Mahon). The meat samples in this case were in dehydrated form, i.e. 5 grams of dehydrated animal protein, equivalent to 15 gms rehydrated.

II. STANDARD CURVE 0, 3.5, 7.0 & 10.5 mls of $2 \times 10^{-5}$ Molar T.E.P. were brought up to 50 mls with the acid solution and 5 mls sampled. This provided a series of 0, 0.5, 1.0, $1.5 \times 10^{-6}$ gms malonaldehyde for optical density readings as in Steps 3, 4 & 5. Readings on the Varion Techtron Model 635 with double beam were, 0, 0.120, 0.240, 0.362. The response curve showed $4.17 \times 10^{-6}$ grams malonaldehyde per unit of optical density.

III. RECOVERY

A duplicate 3.5 mls of $2 \times 10^{-5}$ Molar T.E.P. were put through the whole distillation procedure and resulted in readings of 0.083 and 0.089 giving recoveries of 69% and 74% compared with 0.120 from the Standard Curve. The conservative figure of 69% recovery was used.

IV. CONSTANT

The Constant (K) to multiply optical densities by to get P.P.M. of malonaldehyde in the 5 grm samples is then, $$K = \frac{4.17 \times 10^{-6}}{.69} \cdot \frac{10^6}{.5}$$

$$= 12.1 \text{ (compared with 11.6 for Mahon)}$$

V. P.P.M.

P.P.M. in Sample = Optical Density × 12.1

VI. RESULTS

| SAMPLE | P.P.M (5 gms Dry) | P.P.M. (15 gms reconstituted) |
|---|---|---|
| No Antioxidant | | |
| Beef 30 days at 40° C. | 1.43 | .48 |
| Beef 40 days at 40° C. | 1.43 | .48 |
| Beef 60 days at 40° C. | 1.57 | .52 |
| Antioxidant | | |
| Beef 40 days at 40° C. | .85 | .28 |

BACTERIOLOGICAL ANALYSIS

The bacteriological plate counts on the finished dehydrated products are very low and well within acceptable limits for foods of this type.

Typical analysis are as follows:

(a) BEEF

Total viable plate count on 5 batches gave readings of 44, 28, 70, 50 and 16 organism per gram.

(b) MUTTON

Total viable plate count on 1 batch gave a reading of 200 organisms per gram.

(c) CHICKEN

Total viable plate count on 1 batch gave a reading of 1600 organisms per gram.

(d) BEEF LIVER

Total viable plate count on 1 batch gave a reading of 115 organisms per gram.

(e) BEEF HEART

Total viable plate count on 1 batch gave a reading of 520 organisms per gram.

These are compared with the National Health Institute guidelines which consider that a total viable count of 1,000,000 organisms per gram as a tolerable level.

The following diagnosis of products of this invention was carried out with the results indicated.

DEHYDRATED MEAT PROJECT

1. To check microbiological levels of products
2. To enumerate specified organisms listed in National Health Institute Guidelines April, 1976.

METHODS

1. Total Viable Count: Aliquots of fluid from reconstituted product are mixed with Columbia agar and incubated at 20° and 37°.
2. *Staph, aureus:* Dilutions of reconstituted product inoculated to Baird-Parker medium.
3. Faecal Coli: M.P.N. using Maconkey broth, presumptive positives confirmed by additional tests.
4. *Clostridium perfringens:* Dilutions of reconstituted product inoculated to Egg Yolk Agar medium incubated anaerobically.
5. *Bacillus cereus:* Dilutions of reconstituted product inoculated to Egg Yolk Agar medium and suspect colonies confirmed biochemically and microscopically.
6. Salmonella exclusion: Enrichment media followed by a selective media and biochemical/serology tests as required.

RESULTS

| Product | Date Rec'd | Total Viable count per gram. | *Staph. aureus* per gram | *Faecal coli* per gram | *Clost. per fringens* per gram | *Bacillus Cereus* per gram | *Salmonella* spp. per 25 gram. |
|---|---|---|---|---|---|---|---|
| Beef | 16. 2.78 | 44 | 100 | — | 20 | 100 | absent |
| Beef | 16. 2.78 | 28 | 100 | 100 | 20 | 100 | absent |
| Beef | 21. 2.78 | 70 | — | — | 20 | 100 | absent |
| Beef | 21. 2.78 | 50 | — | — | 20 | 50 | absent |
| Beef | 21. 2.78 | 16 | — | — | 20 | 50 | absent |
| Chicken | 21. 2.78 | 1600 | — | 100 | 20 | 100 | absent |
| Liver | 21. 2.78 | 115 | — | 100 | 20 | 100 | absent |
| Heart | 21. 2.78 | 520 | — | 100 | 20 | 100 | absent |

Eight of the samples received have levels of bacteria that conform standards recommended by the National Health Institute.

The following are the Guidelines for maximum tolerances of microbiological levels in foods as specified by the National Health Institute, Department of Health, Wellington, New Zealand and dated in April 1976.

COOKED FOODS AND COOKED MEATS (Includes frozen pre-cooked meals and all foods not necessarily receiving subsequent heating. e.g. International flight meals, frozen cooked seafoods, "Take-Away" foods.)
Total Viable Count—500,000/g.
*Staphylococcus aureus* (coagulase producing)—100/g.
Faecal Coliform—20/g.
*Clostridium perfringens*—100/g.
*Bacillus cereus*—100/g.
Salmonella—0/25 g.

SEMI-PRESERVED, THOUGH STILL PERISHABLE PRODUCTS (Includes salted, cured or semi-preserved meat, fish and uncooked prepared seafoods. e.g. Fish fingers, crumbed seafoods, vacuum-packaged sliced meat products.)
Total Viable Count—1,000,000/g.
*Staphylococcus aureus* (coagulase producing)—100/g.
Faecal coliform—100/g.
*Clostridium perfringens*—100/g.
*Bacillus cereus*—1,000/g.
Salmonella—0/25 g.

SHELLFISH (Standard as laid down by Shellfish Sanitation Bureau, F.D.A.)
Total Viable Count—500,00/g.
Faecal coliform—230/100 g.
Salmonella—0/25 g.

FROZEN RAW EGG PULP

Total Viable Count—1,000,000/g.
Salmonella—0/25 g.

FROZEN PASTEURISED EGG PULP

Total Viable Count—15,000/g.
Faecal coliform—100/g.
Salmonella—0/25 g.

(Regulation 154 of the Food and Drug Regulations (1973) for the Resazurin Test as described in the Ninth Schedule to these Regulations).

DESICCATED COCONUT

Salmonella—0/25 g.

DAIRY PRODUCTS

The Food and Drug Regulations (1973) contain requirements that control the microbiological standards for a range of dairy products.

| Regulation | 116 | Pasteurised milk |
| " | 117 | Standard milk |
| " | 118 | Recombined milk |
| " | 119 | Flavoured milk |
| " | 121 | Non-fat milk |
| " | 122 | Milk beverages or milk shakes |
| " | 128 | Pasteurised cream |
| " | 129 | Reduced, pouring or sour cream |
| " | 130 | Recombined cream |
| " | 141 | Ice cream |
| " | 142 | Frozen confections |

When subjected to the test described in the Sixth Schedule to these Regulations, 3 out of 5 replicate portions of 0.1 milliliter shall not give evidence of acid formation and gas formation as described in that Schedule.

YOGHURT

Faecal coliform—1/g.
Yeasts and moulds—20/g.

FOOD CONTAINERS

The Food Hygiene Regulations (1974), Regulation 17, Clause 3, Sub-Clause (b), contain requirements governing the microbiological limits for bottles, jars, or jugs, in that residual bacterial plate counts may not exceed
(i) More than 1/milliliter of containing capacity, or
(ii) More than 1/square centimeter of surface area.

SAMPLING

Select at random 10% or 20 units, whichever is the less, from a lot or consignment. Where a consignment is made up of a variety of component units, a minimum of three units from each variety is randomly selected. Wherever possible, unit samples of a product are submitted to the laboratory in the original unopened packaging, maintained in their physical state as at the time of sampling.

INTERPRETATION

With the exception of nil tolerance for Salmonella, where the non-compliance of 1 unit from a lot or consignment constitutes rejection, the following assessment is generally applied.

Where 5 or more units of the same variety from a lot or consignment are analysed, no more than 2 units shall exceed the maximum tolerance for microbiological levels stated in the Guidelines and no one unit shall exceed 10 times the maximum tolerance.

Further two (2) samples of meat dehydrated in accordance with this invention have been analysed as follows:

| Sample Identification | Beef | Mutton |
|---|---|---|
| Total Aerobic Plate Count/gm. | 100 | 200 |
| Total Coliform/gm. | 10 | 10 |
| *Faecal Coliform*/gm | 10 | 10 |
| Salmonella group/gm. | 100 | 100 |
| *Clostridium Perfringens*/gm | 100 | 100 |
| *Staphylococcus aereus*/gm | 100 | 100 |
| *Bacillus cereus*/gm. | 100 | 100 |

SCHEDULE

DETERMINATION OF RANCIDITY IN POULTRY MEATS BY THIOBARBITURIC ACID PROCEDURE

In 1960, Tarladgis, Watts and Younathan published an analytical procedure to determine the level of malonaldehyde in rancid foods by a distillation technique (J.A.O.C.S. 37, 44, 1960). Their method of procedure was somewhat modified by John H. Mahon (Hagen Chemicals & Controls, Inc.) and as such, was tried and adopted by the F.S.I. Analytical Laboratory. One minor change has been in our laboratory to improve the distillation technique resulting in a higher recovery of the malonaldehyde, and at the same time, effectively controlling the foaming phenomenon. The addition of 20 grams of salt (NaCl) to the distillation flask proved to accomplish this.

PROCEDURE

1. Place 5,0000 gram of a well ground meat sample in a 300 ml distillation flask. Add 100 ml of dilute HCl solution and a magnetic stirring rod. Stir to disperse the sample and assemble apparatus with a pre heated electric element.

2. Rapidly distil until exactly 50 ml of the distillate is collected (which requires approximately 6 minutes).

3. Mix the distillate and pipette a 5 ml aliquot into a 25 ml volumetric flask. Add 5 ml of T.B.A. reagent, stopped the flask, mix the contents and immerse in a boiling water bath for 35 minutes.

4. Cool in tap water for 10 minutes and read the absorbance at 532 mu (Bausch & Lomb, Spectronic "20").

5. Multiply the absorbance by 11.6 factor and express as ppm of malonaldehyde.

REAGENTS

T.B.A.: 0.02 M 2-thiobarbituric acid in 90% glacial acetic acid. Bring into solution by warming slightly.

Dilute HCl Solution: Dissolve 200 grams of NaCl (Salt) in distilled water. Add 25 ml of 2 N HCl and make up a liter volume. Take 100 ml for test.

Standard T.E.P.: 1 ml of T.E.P. (1,1,3,3-tetraethoxypropane) weights, 8961 g×72/218=0.2960 g of malonaldehyde. Dilute 20,000 times so that 1 ml will contain 0.0148 mgs.

What we claim is:

1. A process for the manufacture of dehydrated foodstuffs, feedstuffs, or plant fertilizers comprising the steps of:
   (a) subjecting raw or uncooked, or substantially raw or uncooked, protein-containing animal matter to ultra homogenization, prior to the application of heat, to yield an average particulate size of less than about three microns and to reduce any tendons, skin or connective tissues to blend with muscle tissues and to break down fibrous tissue and emulsify associated fats resulting in a smooth, creamy, liquid to semi-solid homogenate;
   (b) heating the resulting homogenate to form a protein agglomerate to effect gelation of said protein;
   (c) granulating the resulting agglomerate;
   (d) partially drying the granulated agglomerate;
   (e) kibbling the resultant partially dried and granulated agglomerate to break open case hardened protein film formed in step (d); and
   (f) drying the resultant Kibbles.

2. The process of claim 1 wherein the heat agglomeration of the protein achieved in step (b) is within a temperature ranging from about 50° to about 85° C.

3. The process of claim 1 wherein the granules are partially dried at a temperature not greater than 95° C.

4. The process of claim 1 wherein the granules are partially dried to a moisture content within the range of about 20% to about 50% by weight.

5. The process of claim 1 wherein the kibbles are dried to a moisture content of not more than 8%.

6. The process in accordance with claim 1, including the additional step of grinding the dried kibbles.

7. A process for the manufacture of a dehydrated protein-containing product comprising the following steps in order:
   (a) subjecting proteinaceous animal matter to ultra homogenization prior to the application of heat, to yield an average particulate size of less than about 3 microns and to reduce any tendons, skin or connective tissues to blend with muscle tissues and to break down fibrous tissue and emulsify associated fats resulting in a smooth, creamy, liquid to semi-solid homogenate;
   (b) heating the resultant homogenate to a temperature of between about 50° C. and 85° C. to agglomerate the protein in the homogenate to effect gelation of said protein;
   (c) granulating the resultant agglomerate;
   (d) partially drying the resultant granules at a temperature not greater than about 95° C. until their moisture content is within the range of about 20% to about 50% by weight;
   (e) kibbling the resultant partially dried granules to break open case hardened protein film formed in step (d); and
   (f) drying the resultant kibbles to achieve a moisture content not more than about 8% by weight.

8. The process as recited in claim 7, further comprising the additional step of grinding the dried kibbles.

* * * * *